United States Patent [19]

Banda

[11] Patent Number: 5,225,149
[45] Date of Patent: Jul. 6, 1993

[54] DETECTION OF CORE THERMAL HYDRAULIC OSCILLATIONS

[75] Inventor: Lionel A. Banda, S. Windsor, Conn.

[73] Assignee: Combustion Engineering, Inc., Windsor, Conn.

[21] Appl. No.: 767,831

[22] Filed: Sep. 30, 1991

[51] Int. Cl.$^5$ .................................. G21C 17/038
[52] U.S. Cl. ........................ 376/255; 376/254; 376/259
[58] Field of Search ............ 376/245, 247, 254, 255, 376/259

[56] References Cited

U.S. PATENT DOCUMENTS

| | | | |
|---|---|---|---|
| 3,819,936 | 6/1974 | Weiss et al. | 250/83.3 R |
| 3,899,676 | 8/1975 | Goldstein et al. | 250/390 |
| 4,617,167 | 10/1986 | Kruse et al. | 376/153 |
| 4,649,015 | 3/1987 | De Volpi | 376/258 |
| 5,015,434 | 5/1991 | Wimpee et al. | 376/254 |

FOREIGN PATENT DOCUMENTS

| | | | |
|---|---|---|---|
| 0110778 | 6/1984 | European Pat. Off. | |
| 132457 | 9/1978 | Fed. Rep. of Germany | 376/245 |
| 216342 | 12/1984 | Fed. Rep. of Germany | 376/245 |
| 9594 | 1/1984 | Japan | 376/254 |
| 3009297 | 1/1991 | Japan | 376/254 |

OTHER PUBLICATIONS

Schmidt, K., "Automatic Neutron and Gamma Flux Density Measuring Device with Computer Control", Kerntechnik, vol. 16, No. 12, pp. 534-537, Dec., 1974.
Patent Abstracts of Japan vol. 9, No. 141 (p-364) Jun. 15, 1985 & JP,A,60 021 440 (Toshiba) Feb. 2, 1985.
Database Wpil Week 8425, Derwent Publications Ltd., London, GB; AN 84-155172 & JP,A,59 081 595 (Hitachi) May 11, 1984.
Database Wpil Week 8451, Derwent Publications Ltd., London, GB; AN 84-314887 & JP,A,59 196 499 (Toshiba) Nov. 7, 1984.
Database Wpil Week 8639, Derwent Publications Ltd., London, GB; An 86-254932 & JP,A,61 181 995 (Hitachi) Aug. 14, 1986.
Database Wpil Week 8749, Derwent Publications Ltd., London, GB; AN 87-344387 & JP,A,62 247 285 (Toshiba) Oct. 28, 1987.
Database Wpil Week 8838, Derwent Publications Ltd., London, GB; AN 88-268462 & JP,A,63 196 897(Toshiba) Aug. 15, 1988.
Database Wpil Week 8716, Derwent Publications Ltd., London, GB; AN 87p14 112446 & JP,A,62 058 194 (Toshiba) Mar. 13, 1987.

*Primary Examiner*—Donald P. Walsh
*Assistant Examiner*—Chrisman D. Carroll
*Attorney, Agent, or Firm*—Chilton, Alix & Van Kirk

[57] ABSTRACT

A plurality of neutron flux sensors (44,46,48,50) and a corresponding plurality of gamma flux sensors (62,64,66,68) are distributed throughout axial zones (24,26,28,30) of the core (14) at the same or closely proximate locations. A steady state comparison, or bias, between the signals of a given neutron/gamma sensor pair are monitored (314, 316), and a divergence (or convergence) can readily be detected through simple signal filtering, to detect a shift in the bias. The pattern of significant convergence and divergence throughout the core, is indicative of the thermal hydraulic stability of the core.

22 Claims, 5 Drawing Sheets

DETECTION OF CORE THERMAL HYDRAULIC OSCILLATIONS

BACKGROUND OF THE INVENTION

The present invention relates to nuclear power reactors, and more particularly to a method and apparatus for detecting thermal hydraulic oscillations in the core of a boiling water reactor.

By the nature of its design, a boiling water reactor (BWR) operates at or near the nucleate boiling point of the coolant which flows through the reactor core. During certain startup conditions, before the main coolant pumps are started, but while operating in the power range under natural circulation flow, voids (steam) can appear within the active fuel region of the core. These local voids are less dense than the surrounding coolant and this results in a decrease in the local moderation of neutrons. The decrease in moderation and thermalization of neutrons, results in a decrease in the nuclear fission rate in the nearby fuel. Such localized depression of the thermal neutron flux can, under certain conditions, cause a power unbalance and thermal-hydraulic instability in the reactor. These can rapidly progress to large thermal hydraulic oscillations.

Boiling water nuclear reactors typically contain a variety of instrumentation, including a plurality of local power range monitors (LPRM) distributed throughout the core. The LPRM is typically responsive to thermal-neutron flux and thus responds to localized flux depressions resulting from localized voiding. One known approach for detecting thermal hydraulic oscillations, uses the LPRMs and monitors the peak-to-peak level between selected quadrant symmetric LPRMs. When the peak-to-peak flux levels exceed a predetermined limit, an alarm or automatic corrective action is initiated.

This prior art technique relies on stochastic signal noise analysis. Because noise analysis is computationally time-consuming, this conventional technique provides a relatively late indication of the occurrence of a problem. In other words, the oscillation is well underway before the detection system of the prior art generates an alarm or initiates corrective action.

SUMMARY OF THE INVENTION

It is an object of the present invention to provide a method and apparatus for detecting the occurrence of thermal hydraulic oscillations in a nuclear reactor core, by overcoming deficiencies in current techniques that rely solely on neutron flux monitoring.

More particularly, it is an object of the present invention to monitor parameters indicative of core thermal hydraulic behavior, with sufficient speed and sensitivity to detect incipient core thermal hydraulic oscillations.

It is a further object of the invention to provide a method and apparatus by which improvement can be made to the performance of neutron-flux sensitive thermal hydraulic oscillation detection systems, without the need to replace or modify the fuel assemblies or core support structure in the reactor.

These objects are accomplished with the present invention by exploiting the difference in the effect of an increase or a decrease in localized voiding, on the local thermal neutron flux and the local gamma radiation flux. Whereas thermal neutron flux is significantly affected by local voiding, the gamma flux is not significantly affected. More generally, a first type of sensor is provided which is representative of localized power generation in the core (and is significantly affected by localized coolant density, i.e., voiding) and correlated to a second type of sensor which is representative of the power in a region of the core (and does not vary significantly with localized density, or voiding).

The approach of the present invention is to not only sense the local void condition, but also to sense the collapse of the local void. The void dynamics are measured and correlated regionally, compared with an acceptance reference criteria, and an alarm or other output is generated to indicate that the core is approaching an unstable condition.

In a preferred form of the invention, a plurality of neutron flux sensors and a corresponding plurality of gamma flux sensors are distributed regionally at the same or closely proximate locations. A steady state comparison, or bias, between the signals of a given neutron/gamma sensor pair are monitored, and a divergence (or convergence) can readily be detected through simple signal filtering, to detect a shift in the bias. The pattern of significant convergence and divergence throughout the core, is indicative of the thermal hydraulic stability of the core.

An instable pattern can be recognized, in one embodiment, by assigning to each neutron/gamma sensor pair, a coded value of, for example, plus 1, 0, or minus 1, representing void collapse, stable and void increase conditions, respectively. The assignment of a code is based on a given phase shift between the two signals. A straight forward information code calculation such as a gray code can then be made symbolic of the oscillation precursor pattern. The number of plus 1's versus the number of minus 1's, are the operatives and need not be quadrant related to point to a high probability of instability.

Thus, the method of the present invention comprises the steps of sensing at each of a plurality of locations within the core, changes in the local neutron flux and gamma flux. From the sensed changes, output data indicative of the spatial distribution and time dependence of voids in the core, are generated.

A system embodiment of the present invention, comprises a plurality of a first type of sensor spatially distributed in the core and sensitive to localized power fluctuations. A plurality of a second type of sensor is spatially distributed in the core, and relatively insensitive to localized power fluctuations. First means are provided for associating each of the first type of sensor with one of the second type of sensor, to define a plurality of paired measurement values. Second means are provided for generating first output data signals commensurate with a quantitative relationship among the paired measurement values. Third means, responsive to the second means, are provided for generating second output data indicative of the spatial distribution of voids in the core.

The present invention is an improvement over known techniques for detecting void induced-thermal hydraulic oscillations, because a stochastic process analysis need not be developed through Fourier or other techniques. This avoids the need for large amounts of sampled data to develop statistical validity. The limitation in the inventive system is the time response of the sensors. The detection of incipient stability can be achieved in less than about five seconds.

These and other objects and advantages of the invention may be better understood from the following description of the preferred embodiment.

BRIEF DESCRIPTION OF THE FIGURES

The preferred embodiment is described with reference to the accompanying drawings, wherein like numerals represent like structures and wherein.

DESCRIPTION OF THE PREFERRED EMBODIMENT

Figure 1:
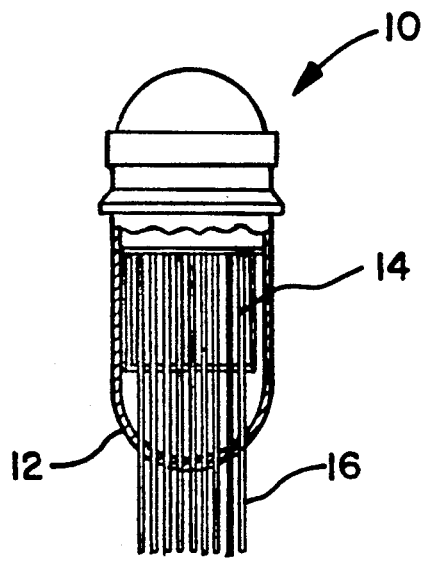
FIG. 1 is a schematic elevation view of a boiling water nuclear power reactor including local power range monitor assemblies.

FIG. 1 is a schematic elevation view of a BWR 10, wherein the main constituents of interest in the present invention are the reactor vessel 12 and reactor core 14. It is commonly understood in the field of nuclear power reactor design, that the core 14 comprises a multiplicity of fuel assemblies or bundles, each containing a regular array of nuclear fuel rods (not shown) that are spaced laterally from each other on a substantially uniform pitch. Water under pressure is pumped axially through the flow channels defined by the spaces between neighboring fuel rods. This water acts as a moderator, to slow down fast neutrons generated during nuclear fission in the fuel, and thereby provide a supply of thermal neutrons necessary for sustaining the criticality of the fission process. The water also acts as a coolant for removing heat from the fuel rods. In a BWR, the coolant moderator itself is converted to steam at the core exit for delivery to a turbine generator set.

The performance of the core 14 is monitored with a variety of instruments situated both within the core 14 and outside the vessel 12. Among such conventional instruments are a type of elongated instrument assembly, commonly referred to as local power range monitors 16 (LPRM) which, prior to reactor start-up, are passed upwardly through the bottom of the vessel 12 and secured in position. Each LPRM is typically situated in a guide tube that is part of a fuel assembly, and thus extends through wire in parallel with the fuel rods. Conventional LPRM assemblies 16 are available from several vendors including Imaging and Sensing Technology Corporation, Horseheads, N.Y.

Figure 2:
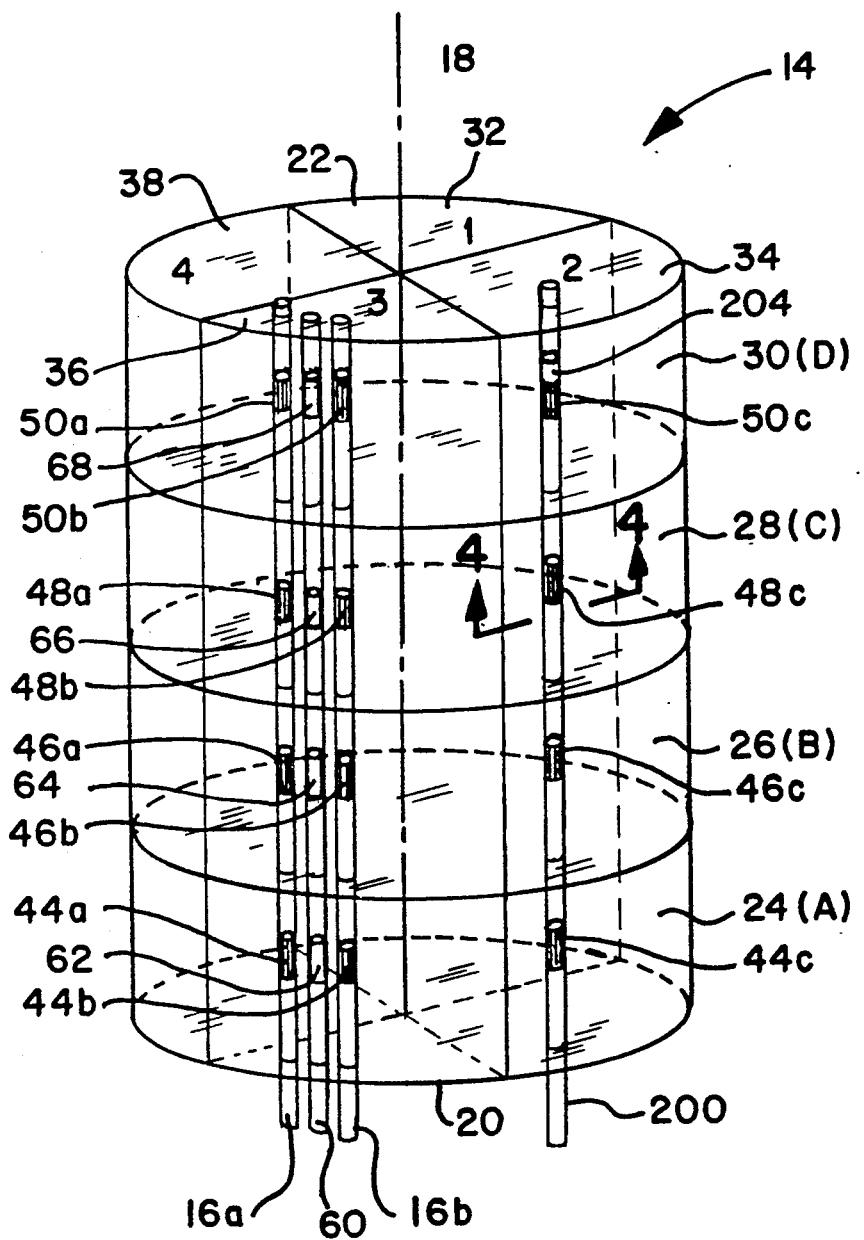
FIG. 2 is a diagrammatic representation of the core of the nuclear reactor of FIG. 1, figuratively divided into four axial zones and four azimuthal quadrants.

FIG. 2 is a schematic representation of the BWR reactor core 14 figuratively divided into sixteen regions symmetrically disposed about a longitudinal axis 18. The core has an entrance end 20 for admitting coolant, and an exit end 22 above which the working fluid no longer absorbs heat from the fuel rods (not shown). The core is axially divided into four zones 24, 26, 28 and 30 (also designated A, B, C and D, respectively), each of which is for simplicity in the form of an upright cylinder. The core is also figuratively divided azimuthally into first, second, third and fourth quadrants 32, 34, 36 and 38. The four axial zones and the four quadrants in each zone, define sixteen spatially distinct, volumetric regions of the core. In the present description, each region may be uniquely identified by an alphanumeric designation, such as D2, which identifies the second quadrant in the uppermost axial zone D.

It is typical of the conventional BWR design to provide in the core 14, at least two and more commonly, at least eight, LPRM assemblies in each quadrant. For example, as shown in FIG. 2, the third quadrant 36 has two LPRM 16a, 16b axially spanning the core.

Figure 3:
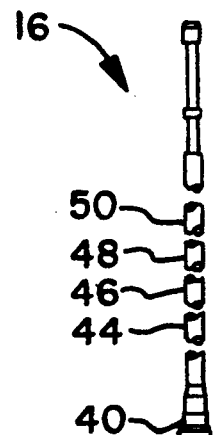
FIG. 3 is a schematic view of a conventional low power range monitor assembly (LPRM)

FIG. 3 shows additional details for a conventional LPRM assembly 16. The assembly 16 includes an elongated, outer housing or sheath 40 connected at its lower end to a sealing surface 42 which is secured to a mating surface (not shown) at the penetration of the assembly 16 through the lower wall of vessel 12. Within the sheath 40, a plurality, typically four, detector strings 44, 46, 48 and 50 are encapsulated. Each detector string has an active, sensor portion located within the sheath 40, such that when the assembly 16 is in place, each sensor will be located in one of the four axially distinct zones A, B, C and D, respectively. Below the sealing surface 42, the detector strings 44, 46, 48 and 50 terminate in connectors 52, 54, 56 and 58, respectively, which mate with signal amplification, and conditioning equipment.

Typically, each sensor in the LPRM assemblies 16 is in the form of a miniature fission chamber which generates an electrical signal proportional to the local neutron flux. This provides a measure of the local power density. In the present context, "local" should be understood to mean the average power produced by the fission events within a distance from the sensor corresponding to less than about two fuel rod pitches. As mentioned in the background portion of the present specification, the local power density as measured by conventional LPRM, has been utilized to detect thermal hydraulic oscillations in the core 14.

When installed, a LPRM is exposed to a spectrum of neutron and gamma energies. A percentage of the incident thermal neutrons interact with the uranium coating causing a fission event to occur. Equation 1 describes the fission event, where x and y stand for two fragments of roughly the same mass. As a fragment traverses the gas, it gives up a portion of its kinetic energy to the gas atoms. If sufficient energy is imparted to a given atom an electron is ejected (ionized) from the atom leaving a positive ion. The ionized electrons and positive ions between the electrodes are collected to form the measured LPRM element signal.

$$U^{235} + n \text{ (slow)} \rightarrow x + y \tag{1}$$

In a fashion similar to fragments, incident gamma ray interactions will result in the detector's gas being ionized. On average the number of ionizations occurring due to gamma ray interaction are considerably lower than that of a fission fragment. However, as the neutron sensitive material is depleted, the gamma induced ionizations become an increasingly significant portion of the element's signal. To increase lifetime, IST mixes $U^{234}$ with its $U^{235}$ coating to form a regenerative neutron sensitive material.

Core thermal hydraulic instability is a result of an imbalance in the local relationship between power (heat) generated in the fuel rods and the heat absorbing capability of the working fluid at the given location. Such imbalances are often caused by a rapid runback or trip of one or more of the fluid recirculation pumps (not shown). The imbalance can also occur during certain start-up conditions, before coolant pumps are started, while operating in the power range under natural circulation flow. The phenomena of instability for a BWR core was established early in the design process for this type of reactor. At low flow conditions, the reactor power transfer function can show a trough at the low frequency end (<0.8[Hz]) indicating a resonance hydraulic system. As flow increases, the trough disappears indicating stable hydraulics. This condition of resonance can be defined as the in-core fuel channel flow response to a reactivity disturbance. First reactivity is added; then, the core's reaction to this reactivity addition is to modulate flow. If the reactivity feedback is in sympathy with the hydraulic modulation, undampened oscillations can occur. Because the undampened oscillations have the potential to exceed fuel design limits under unique circumstances, operating BWRs in the United States are under direction to avoid the operating space where hydraulic oscillations can occur.

When a power to flow condition exists that could initiate core wide oscillations, field data shows that when increasing oscillations occur, there is a shift in the void distribution axially and that, as a consequence, the power distribution is peaked at the bottom of the core. If this axially oscillation of the voids and the power distribution is at the resonance hydraulic frequency, the flux oscillations can become undampened.

Figure 4:
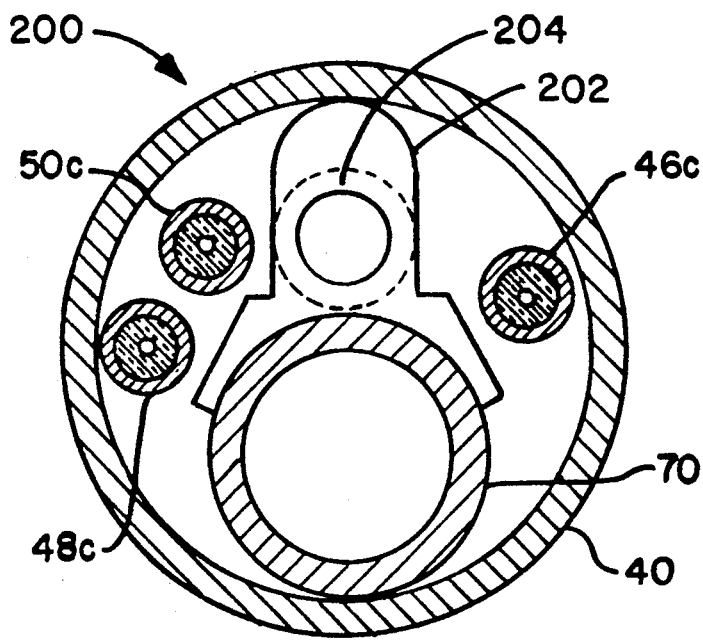
FIG. 4 is a schematic sectional view of an LPRM assembly modified to include a gamma flux detector in accordance with one embodiment of the present invention.
Figure 5:
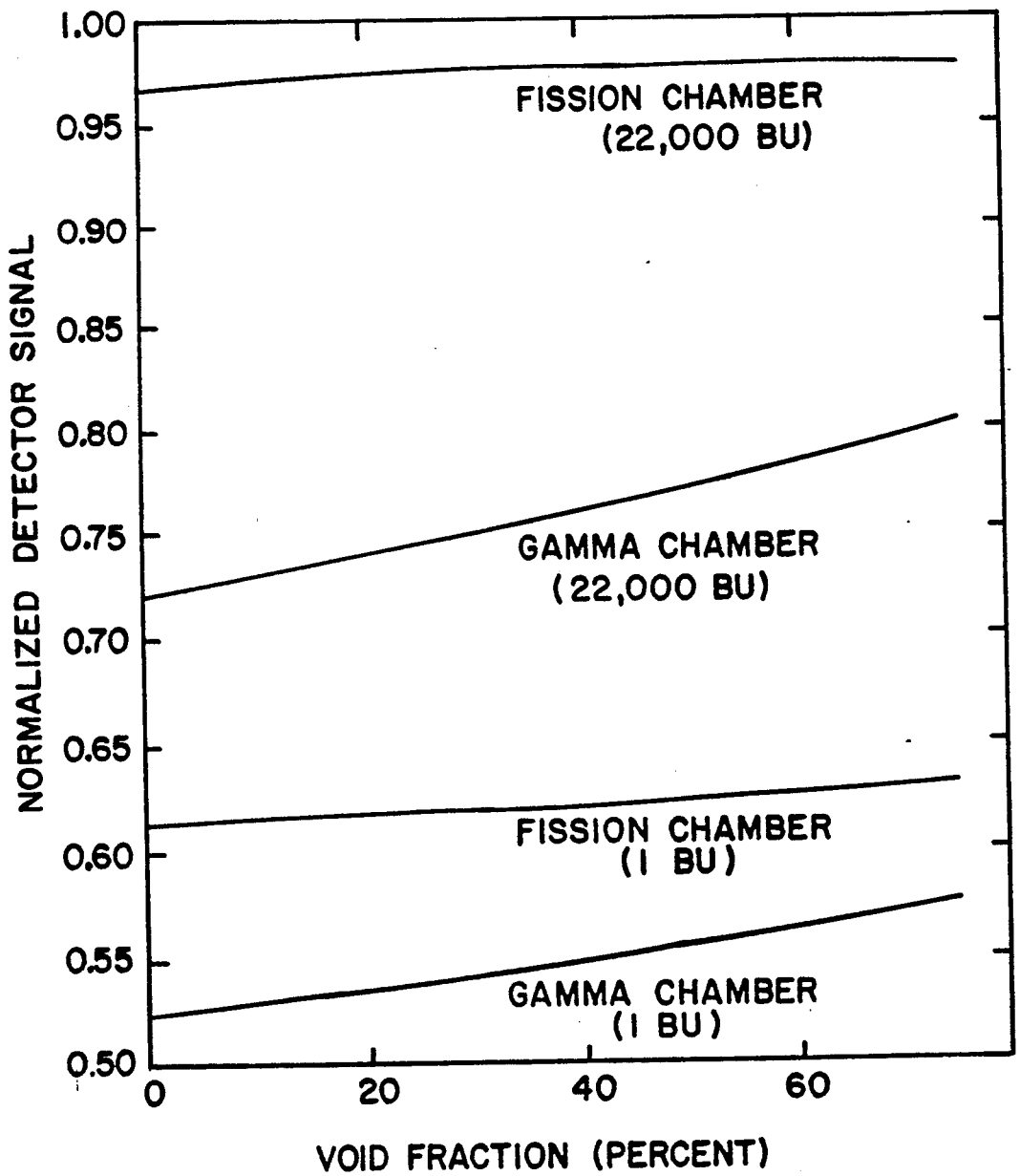
FIG. 5 is a graph showing neutron and gamma detector responses vs. void fraction.

As represented in FIGS. 2, 4 and 5, the present invention provides a method and apparatus for improving the detection of such thermal hydraulic oscillations in the core. This is accomplished by not only measuring the local power density, but also separately detecting an associated regional power density, as manifested for example by the gamma radiation resulting from the fission process within a distance from the sensor corresponding to at least about ten fuel rod pitches.

The ability to measure neutron and gamma flux simultaneously provides a qualitative measure of void fraction in a local region. Since both the neutron flux and gamma flux are modified by voids to different degrees, the relative signal difference is used to detect and correlate the magnitude and changes in voids. With differing power or flow conditions, voids redistribute within a BWR fuel channel affecting the local fluid density. This change in fluid density alters the flux attenuation. Both the neutron and gamma sensor reaction is essentially real time and is sufficient to measure the redistribution of voids with local power or flow changes. FIG. 5 shows the calculated relative response between a LPRM fission chamber and a gamma chamber of equal dimensions, versus void fraction. The relative response changes with fuel burnup and depletion of detector's neutron sensitive material.

Since one can infer the void fraction from the signal difference, it is possible to correlate this information with average channel flow velocity within the instrumented fuel bundle. The fission chamber and paired gamma chamber sensors offers a means to sense the onset of undampened oscillations. During normal operations, natural reactor noise will excite both sensors and they will show normal 1-5% output signal amplitude oscillations over time. Because of their fast response times, these oscillations should be in phase and a phase detection system between the two signals will be near zero phase difference.

With increasing hydraulic/flux oscillations, the signal phase difference between the two sensors begins to shift in response to the axially shifting voids. This is because the gamma flux is developed from a greater fuel area than the neutron flux and would tend to be delayed because of the greater source field. Therefore, a phase shift will occur between the two signals. Proper signal processing will then allow for detecting and monitoring the core oscillations.

In one embodiment of the invention represented in the third quadrant (FIG. 2) two conventional LPRM assemblies 16a, 16b, and a separate gamma radiation intensity detector string 60 provided. Each detector assembly 16a, 16b, and 60 contains a sensor in each zone, A, B, C and D of the third quadrant. In this embodiment of the invention, each of the other quadrants 1, 2, and 4 would be similarly instrumented. Thus, a plurality of neutron flux sensors are positioned at a respective plurality of first locations in the core, and a plurality of gamma flux sensors are positioned at a respective plurality of second locations in the core. In the presently described embodiment, the first and second locations do not necessarily have a one-to-one correspondence. For example, gamma assembly 60 has four axially spaced sensors 62, 64, 66, and 68. Each of the neutron sensors 44a, 44b, is associated with sensor 62; likewise sensors 46a, 46b and sensor 64; 48a, 48b and 66; and 50a, 50b and 68 are associated as pairs.

Each of the neutron sensors in a given assembly 16, generates an output signal commensurate with the local neutron flux at the sensor. Similarly, each of the sensors in the gamma assembly 16 generates an output signal commensurate with the gamma flux in the region surrounding the gamma sensor. In accordance with the present invention, the output signals generated from the neutron sensors are compared with the output signals generated by the gamma sensors to produce spatially-depended comparison value data. The comparison value output data are monitored during the flow of coolant through the reactor core. Preferably, the comparison value data are continually compared with established acceptance criteria. When the output data falls outside the acceptance criteria, another output signal indicative of actual or incipient core thermal hydraulic oscillations is generated and displayed or used to actuate an alarm or other corrective action.

Figure 6:
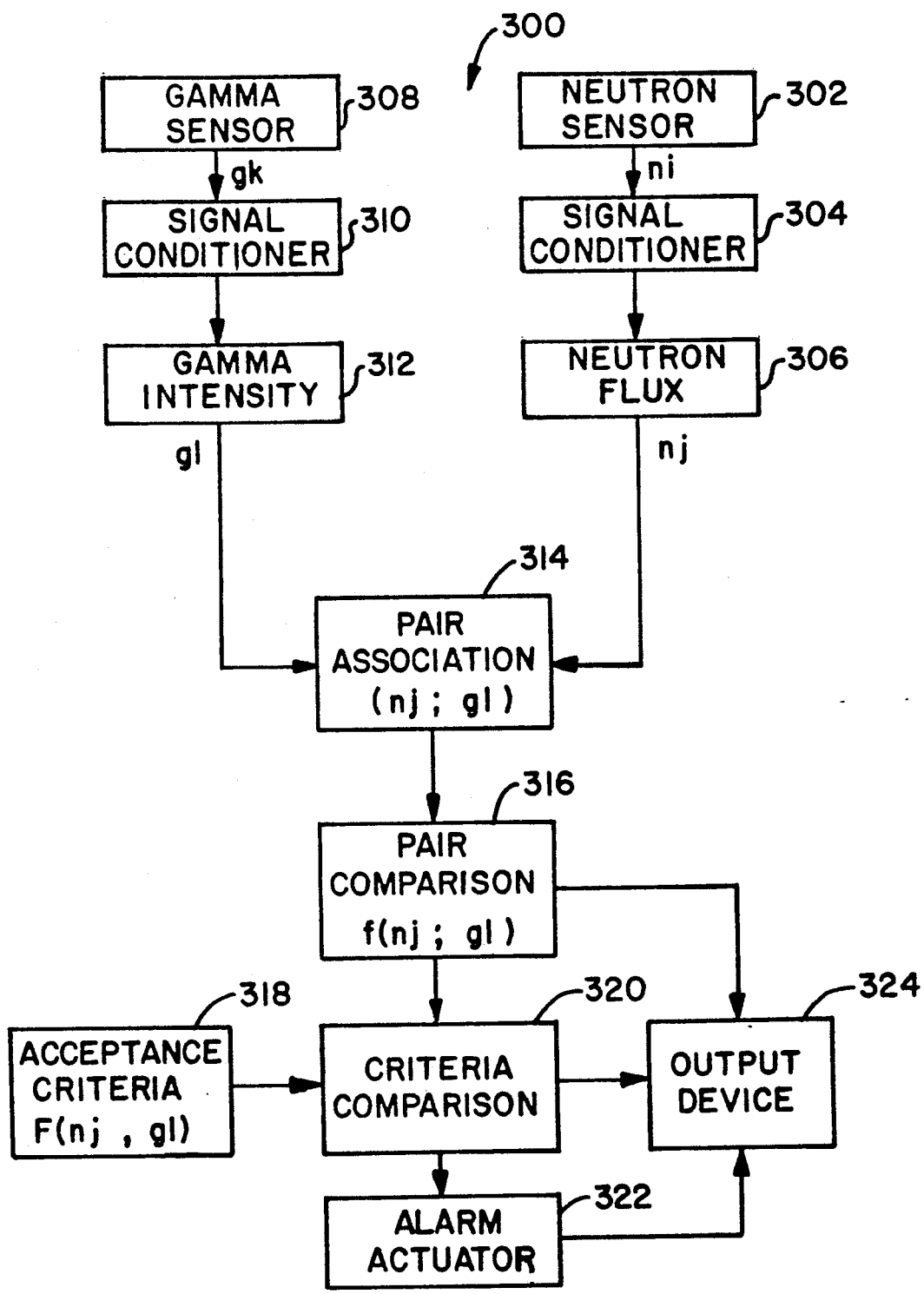
FIG. 6 is a block diagram representing a generic level of signal processing associated with the present invention.

The apparatus for carrying out this method is shown schematically in FIG. 6. The system 300 includes a plurality of neutron flux sensors each of which generates a raw signal $n_i$ as represented in block 302. In the presently described embodiment, there would be a total of 32 neutron detectors in the core, with detector signals 50a and 50b as shown in FIG. 2, being represented by, for example, $n_{29}$ and $n_{30}$. The signals $n_i$ are delivered through the respective connectors to a signal conditioning circuitry of any conventional design, as represented in block 304. The signal from sensor $n_i$, after conditioning, appears as neutron flux signal $n_j$ commensurate with the neutron flux at the sensor. In similar fashion, each gamma sensor represented at block 308 produces a signal $g_k$, which is conditioned at block 310 into a output signal $g_l$ commensurate with the gamma radiation. In the present embodiment, the core would have 16 gamma sensors, with sensor 68 producing a signal $g_k$ of $g_{15}$.

A key feature of the present invention is that the neutron flux signals indicative of fluctuations in the local power density are normalized to the output signal of a gamma sensor, which is significantly less sensitive to local power variations. The normalization can take a variety of forms, but in a general sense, the normalization begins with establishing a paired association of measurement values, as indicated in block 314 by the notation $(n_j; g_l)$. The pairing is between the neutron signal(s) preceding the semicolon, and the gamma flux signal following the semicolon. In the present example, the conditioned signals originating as $n_{29}$ and $n_{30}$ are paired with the gamma sensor signal originating as $g_{15}$ (i.e., $(n_{29}, n_{30}; g_{15})$).

The level of pairing or association can itself take several forms of normalization. For example, a bias (i.e., difference), between each of the neutron signals of the pair and the gamma signal of the pair, can be determined. Similarly, a ratio between each neutron signal and the gamma signal can be determined. Although not preferred, the neutron signals indicated at the left of the colon could be combined or averaged before the comparison with the gamma signal.

Thus, block 316 is generally characterized as comparing the paired measurement values, this comparison being represented in a functional form $f(n_j;g_l)$. As stated above, this comparison may be a difference, a ratio, or correlation. Moreover, a paired measurement value comparison is established for each of the gamma sensors throughout the core. Further, as stated above, at least one neutron sensor is paired with each gamma sensor. Thus, the processing associated with block 316 would, in the preferred embodiment, result in a matrix or output data table, in which for each of a plurality of spatially distinct volume representations in the core, the variables of time and the paired measurement comparison values are related. For example, a multi-dimensional vector containing the following entries is preferred: time (seconds); zone (A, B, C or D); quadrant (1, 2, 3 or 4); and the paired measurement value comparison ($v_c$) from block 316. Of course, it may be understood that the present description based on 16 gamma sensors located respectively in 16 core regions, is merely an example, and that preferably more detectors and spatially smaller regions of the core would be utilized in an actual working system.

As stated above, the nature of the comparison between the paired measurement values $n_j;g_l$, is somewhat flexible. In a straightforward implementation of the present embodiment, the comparison would simply be a difference in signal amplitude, which in the steady state can be viewed as a bias, and, as such, can be adjusted to any desired reference bias. During core behavior that deviates from the steady state, and particularly upon the occurrence of voiding in the core, the bias will diverge or converge, depending on whether the voids are growing or collapsing. If the difference in signals exceeds a predetermined tolerance, the comparison value $v_c$ can be set to equal $+1$. Similarly, if the difference converges by more than a tolerance amount, the value $v_c$ can be set equal to $-1$. Thus, the output of block 316 would be a matrix containing, for example, one column vector for each of the regions of the core with the variable of time changing continually, for example at a convenient sampling rate of one Herz, and the variable $v_c$ assuming the value 0, $+1$ or $-1$ according to whether the bias between the neutron and gamma sensors of a pair is within the nominal range, diverging, or converging in excess of a predefined tolerance.

In block 318, an analogous matrix $F(n_j;g_l)$ is stored, for defining the boundaries of an operating envelope, within which any core instabilities are considered insignificant, and outside of which the operator should be warned of the likelihood of incipient, or actual, core thermal hydraulic oscillations. Thus, in block 320, the time, space, and measured value matrix $f(n_j;g_l)$ is compared with the acceptance criteria matrix $F(n_j;g_l)$. In the event the comparison indicates a developing or actual oscillation, an alarm data signal is delivered to the alarm actuator 322, which may be a combination of one or more visual, auditory or other humanly perceptible actions. Furthermore, for record retention purposes, data generated in blocks 316, 320, and perhaps 322, may be stored in digital form in an output device 324 such as on a magnetic memory storage device, on paper print-out, or the like, for future retrieval and analysis.

Moreover, with the embodiment described immediately above, the utilization of the comparison value $V_c$ in the form of 0, $+1$, or $-1$, is well suited to visual representation of the core behavior by means of a gray scale image that is presented to the operator as it evolves in time. A straightforward information code calculation such as a gray code, can be made symbolic of the precursor of the pattern of precursor behavior to thermal hydraulic oscillations. The number of $+1$'s versus the numbers of $-1$'s are the operatives and need not be quadrant related to point to a high probability of instability. Event theory justifies high confidence on the number of $+1$'s and $-1$'s in any time frame and whether this pattern is increasing toward instability, based on the next time sample. Such processing is very fast, within the time constraints of the system.

It should be appreciated that, as shown in FIG. 2, a particular gamma sensor 68 and its paired neutron sensors remain in fixed spatial relationship corresponding to the relationship upon which the reference or acceptance criteria $F(n_j;g_l)$ was established.

As stated above, although each pair need not be supported within the core at exactly the same location, it is desirable that a given gamma sensor and its paired neutron sensor(s) be supported within a distance of each other no greater than the equivalent of about ten per cent of the core axial dimension.

FIGS. 2 and 4 depict a second, preferred embodiment of the invention. In this embodiment, a conventional LPRM of the type shown in FIG. 3, is modified to include within the same sheath or housing, at least one gamma sensor. Such a combined monitoring assembly 200 is shown in cross-section in FIG. 4, as seen in the direction of the arrows indicated on the section line 4—4 in FIG. 2. At that section line, looking upward through the assembly 200, the cables for neutron sensors 50c, 48c, and 46c are visible, as is the calibration tube 70 that traverses the housing 40. In accordance with the modification of the present embodiment, a mounting lug 202 is secured to the calibration tube 70, and at least one gamma sensor 204 is supported by the mounting lug. In practice, the combination assembly shown in FIG. 4 has a sheath 40 having a 0.750 inch O.D. and a 0.048 inch wall thickness. Within this sheath 40, it is possible to support the gamma sensor within one inch (i.e., preferably within 0.50 inch) of a paired neutron sensor.

As shown in FIG. 2, a given combination assembly 200 may have only one gamma sensor 204. In practice, a BWR core 14 may have up to 10 LPRM's per quadrant and any four of the LPRM in each quadrant could be modified to serve as a combined assembly such as 200, with each one of the four carrying the gamma sensor such as 204, for positioning in a different axial zone A, B, C, D of the quadrant. Preferably, at least two gamma sensors are provided in each quadrant, at each of at least four axial zones.

Thus, it may be appreciated that the gamma sensors and neutron sensors can be supported in different housings, as described in the first embodiment and shown in the third quadrant of FIG. 2, or at least one neutron sensor and one gamma sensor can be supported within a common housing. Preferably, one neutron sensor is paired with one gamma sensor, and supported within a common housing. Moreover, the most desirable configuration would provide that each of up to 232 neutron sensors and respective paired gamma sensor be physically abutting or connected in tandem at each of the fission chamber locations such as 44, 46, 48 and 50 (FIG. 3), using a common cable such as 52, 54, 56 and 58 respectively.

Figure 7:
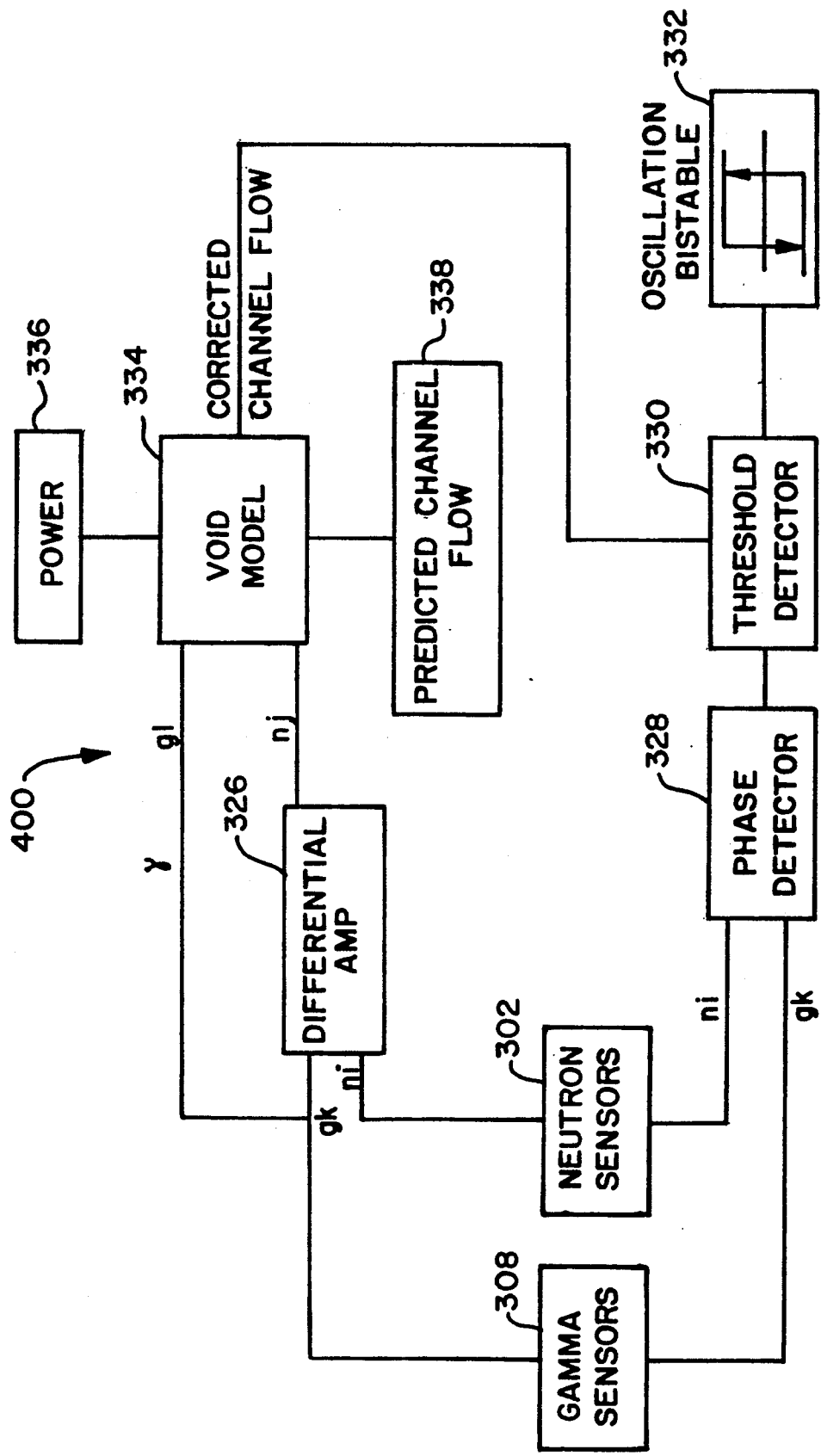
FIG. 7 is a flow diagram representing a more detailed level of signal processing associated with the preferred embodiment of the invention.

FIG. 7 is a flow diagram of the preferred embodiment, wherein a given gamma sensor 308 is located substantially adjacent to its paired neutron sensor 302, such as shown in the second quadrant in FIG. 2. Ideally, the gamma sensor would have a sensitivity substantially identical to the gamma sensitivity of the fission chamber of the neutron sensor. For example, a typical fission chamber would have a neutron sensitivity of $4.6 \times 10^{-18}$ amps/nv, and the inherent gamma sensitivity would be $2.5 \times 10^{-14}$ amps/R/hr. If the intimately located, yet distinct gamma sensor 308 is designed to have the same sensitivity, i.e., $2.5 \times 10^{-14}$, the signal conditioning indicated at 304 in FIG. 6 can be accomplished by a differential amplifier 326 as shown in FIG. 7. This signal processing subtracts from the output signal $n_i$ of neutron sensor 302, the output signal $g_k$ from the gamma sensor 308, which therefore has the effect of generating and output signal $n_j$ that is free of the influence of gamma radiation. Moreover, the gamma flux signal $g_k$ from detector 302 does not require the kind of signal processing represented in block 310 of FIG. 6 because it has, in essence, been normalized as a result of the preestablished matching of sensitivity to the gamma response of the neutron sensor 302 and the proximity to the neutron sensor in the core.

The output signals $n_i$ and $g_k$ from the neutron sensor 302 and gamma sensor 308 are also delivered, without differentiation, to a phase detector 328 where, for reasons discussed above, the different effect due to changes in voids, is most pronounced as between the gamma and neutron sensors. Thus, in the embodiment represented by FIG. 7, the phase detector 328 performs a particular type of comparison, which is indicated more generically at block 316 of FIG. 6. Moreover, it should also be appreciated that the function performed by block 314 of FIG. 6, whereby a particular neutron sensor is associated as a pair with a particular gamma sensor 308, is in the embodiment of FIG. 7, inherently achieved by using the signals from the adjacent sensors having output leads that are physically adjacent. The function performed by block 330 in FIG. 7 is an implementation of the functions indicated in blocks 318 and 320 in FIG. 6. The oscillation condition that warrants an alarm or other desirable action on the part of the operator or plant control system, is indicated at block 332.

The modeling of the reactor core for determining the acceptance criteria 318 and the criterial comparison 320 as indicated in FIG. 6, can be achieved in any number of ways. The void model represented at 334 in FIG. 7 includes input signals indicative of the gamma response $G_l$ and neutron response $n_j$, as well as the information concerning the axial power distribution in the channel from block 336 and the predicted channel flow from block 338.

Tests at several operating reactors have shown that prior to the onset of divergent oscillations, there is a marked shift of power distribution toward the bottom of the core. This is attributed to a significant shift in void co-efficient in the center of the fuel assemblies. The gain margin of a BWR system is in effect not only a measure of the system stability but also a measure of how much the void coefficient of reactivity could be increased before divergent oscillations occurred.

For an oscillation detection system based on shift in void fraction, the key information from FIG. 5 is the change in signal ratios (neutron/gamma) with a shift in void fraction. At the beginning of the fuel cycle, this shift is about 4% from 25% void to 75% void. At the end of the cycle (46,000 MWD/MT), the shift in signal ratio is as high as 12%. These shifts are readily detectable using signal processing electronics. Standard process noise is in phase between both detectors if located in the same axial plane. Therefore, process noise (about 2-5%) would not mask the shift.

Given inputs from blocks 326 and 336, and a measured void fraction from a family of curves such as FIG. 5, a determination of channel flow can be made. This determination is compared to a prediction model of flow from 338 and a corrected value of channel flow is then used as a bias against the phase difference between the two signals $n_i$ and $g_k$. If the local channel flow is low and the phase difference between $n_i$ and $g_k$ in the adverse direction is large, a truth level +1 is set. A balanced condition generates a truth level 0, whereas unbalance in the safe direction sets a −1. Only a truth level +1 "arms" the oscillation bistable 332 and with sufficient numbers of +1's from other detector pairs, alarm and automatic action is taken.

I claim:

1. A method for detecting thermal hydraulic oscillation in a nuclear fission reactor core through which a reactor coolant passes while the fission reactions in the core generate neutrons and gamma radiation, comprising the steps of:

positioning a first plurality of sensors, which are primarily responsive to neutron flux, at a respective plurality of first locations in the core;

positioning a second plurality of sensors, which are primarily responsive to gamma radiation flux, at a respective plurality of second locations in the core;

generating an output signal from each of said neutron sensors, commensurate with the neutron flux at each neutron sensor;

generating an output signal from each of said gamma sensors, commensurate with the gamma radiation flux at each gamma sensor;

comparing each neutron sensor output signal with a respective gamma sensor output signal and generating a comparison value signal for each of said comparisons; and in response to the comparison value signals generating output data indicative of core thermal hydraulic oscillations.

2. The method of claim 1, further including the steps of, generating intermediate output data indicative of the spatial distribution within the core, of said comparison values;

monitoring the intermediate output data while coolant flows through the core; and in response to the monitored intermediate output data, generating said output data as final output data.

3. The method of claim 1, wherein the step of positioning includes supporting each neutron sensor in fixed spatial relationship to one gamma sensor, thereby defining a plurality of sensor pairs, and said step of comparing includes the step of comparing the neutron output signal with the gamma sensor output signal for each of said pairs.

4. The method of claim 2, wherein the step of generating intermediate output data includes generating a comparison value in the form of a symbolic code indicative of whether the location of each neutron sensor is experiencing an increase or decrease in coolant voids.

5. The method of claim 3, wherein the step of positioning each sensor in each sensor pair at respective first and second locations, includes supporting the sensors in each pair no farther apart than about ten percent of the core axial dimension.

6. The method of claim 3, wherein the step of positioning each sensor in each sensor pair at respective first and second locations, includes the step of supporting the sensors no farther apart than about one inch.

7. The method of claim 3, wherein the step of positioning includes supporting each sensor in the sensor pair at respective first and second locations within a common housing.

8. The method of claim 3, wherein the neutron sensor output signal includes a time-dependent amplitude commensurate with the neutron flux and the gamma sensor output signal includes a time-dependent amplitude commensurate with the gamma flux and the step of comparing includes determining a time phase difference between the signal amplitudes for each pair.

9. The method of claim 3, wherein the neutron sensor output signal amplitude is commensurate with the neutron flux and the gamma sensor output signal is commensurate with the neutron flux, and the step of comparing includes determining the difference of the signal amplitudes for each pair.

10. The method of claim 3 wherein, said first plurality of sensors includes at least four neutrons flux sensors spaced apart axially in the core, and said second plurality of sensors includes at least four gamma flux sensor spaced apart axially in the core.

11. The method of claim 8 wherein said plurality of sensor pairs include at least one pair in each of at least two axial zones in the core.

12. The method of claim 10 wherein each of said gamma sensors is located within a distance from one of said neutron sensors, equivalent to no more than about ten percent of the axial dimension of the core.

13. The method of claim 10, wherein each of said gamma sensors is located within about one inch from one of said neutron sensors.

14. A method for detecting thermal hydraulic oscillations parallel to the axis of the core of a boiling water nuclear reactor, comprising the steps of:

sensing at each of a plurality of axially spaced apart zones within the core, changes in the local neutron flux and gamma flux; and from said sensed changes, generating output data indicative of incipient thermal hydraulic oscillations in the core.

15. The method of claim 14, wherein the step of sensing includes supporting in each zone a gamma flux sensor in fixed spatial relation to a neutron flux sensor at substantially the same location in the zone.

16. The method of claim 15, wherein the step of sensing changes includes comparing the sensed neutron flux to the sensed gamma flux at each location and generating a comparison value signal commensurate with said comparison.

17. The method of claim 15, wherein the step of generating output data includes generating symbolically coded values for each location, commensurate with a quantitative relationship between the neutron and gamma fluxes as sensed at each location.

18. A system for monitoring thermal hydraulic oscillations in a boiling water nuclear reactor, comprising:

a plurality of a first type of sensor spatially distributed in the core, said first type of sensor having a first time dependent output signal, commensurate with the density of reactor coolant over a short range during the generation of power in the reactor core;

a plurality of a second type of sensor spatially distributed in the core, said second type of sensor having a second time dependent output signal which, relative to the first type of sensor, is commensurate with the density of the coolant over a long range during power operation of the reactor core;

means for associating each of said first type of sensors with one of said second type of sensors, to define a plurality of sensor pairs;

means for generating a third output signal commensurate with a quantitative relationship between the first and second output signals from the sensors in each pair, thereby defining a plurality of paired time dependent measurement values; and means responsive to the paired measurement values, for generating output data indicative of thermal hydraulic oscillations in the core.

19. The system of claim 18, wherein the second type of sensor is responsive to gamma radiation intensity.

20. The system of claim 18, wherein the first type of sensor is responsive primarily to thermal neutron flux and the second type of sensor is responsive primarily to gamma radiation intensity.

21. The system of claim 20, including means for supporting the first and second sensors of a given pair within a common housing in the core.

22. The system of claim 21, wherein the housing is an in-core instrument tube passing through the full longitudinal dimension of the core, and wherein each tube contains a plurality of axially spaced neutron flux sensors, and at least one gamma flux sensor.

* * * * *